J. B. STEWART.
PEDAL.
APPLICATION FILED FEB. 27, 1919.

1,320,585.

Patented Nov. 4, 1919.

INVENTOR
Joseph B. Stewart
BY
ATTYS

UNITED STATES PATENT OFFICE.

JOSEPH BROWN STEWART, OF WINNIPEG, MANITOBA, CANADA.

PEDAL.

1,320,585. Specification of Letters Patent. Patented Nov. 4, 1919.

Application filed February 27, 1919. Serial No. 279,534.

*To all whom it may concern:*

Be it known that I, JOSEPH BROWN STEWART, of the city of Winnipeg, in the Province of Mantoba, Canada, have invented certain new and useful Improvements in Pedals, of which the following is the specification.

This invention relates to improvements in foot pedals, particularly to automobile foot pedals as utilized with the accelerator, and the objects of the invention are to provide an inexpensive, simply constructed yet durable pedal which can be readily attached to the car and will prevent the foot from slipping as well as act as a rest for the foot which operates the accelerator pedal and to construct the pedal so that it will act as a protection to the foot against the heat of the engine.

With the above object in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

Figure 6:
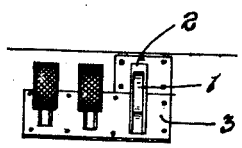
Fig. 6 represents a front view of the pedal plate.

I have not considered it necessary in the present disclosure to give a very minute description of the automobile parts with which my foot pedal is associated. In actual practice the foot pedal is utilized with what is commonly known as the accelerator pedal of the car and this is shown in the drawings but not described in detail.

1 represents the usual accelerator pedal of an automobile which operates in the customary slot 2 provided in the pedal plate 3 which is permanently secured to the bottom A of the automobile body.

Under ordinary circumstances considerable unpleasantness is experienced owing to the hot air blowing back from the engine through the slot 2 and uncomfortably heating the foot which operates the accelerator pedal.

According to my invention I provide a heat insulating foot pedal distinct from the accelerator pedal but engaging the same which prevents this unpleasantness. The foot pedal is arranged and constructed as now described.

4 represents an under more or less foot shaped board made from wood or such like material and on the upper surface of this I apply an asbestos lining 5 which is covered over on the top side by a rubber coating or facing 6 presenting a roughened surface. In the board 4 I make a number of suitably spaced cross passages 7 which pass from side to side of the pedal. I then make openings 8 leading from the underside of the foot pedal to the passages. The object of these holes and passages will be later explained.

Figure 1:
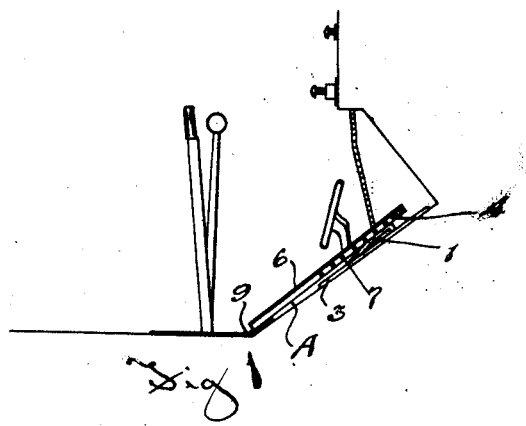
Figure 1 represents a side view of my foot pedal as it appears installed on an automobile.
Figure 2:
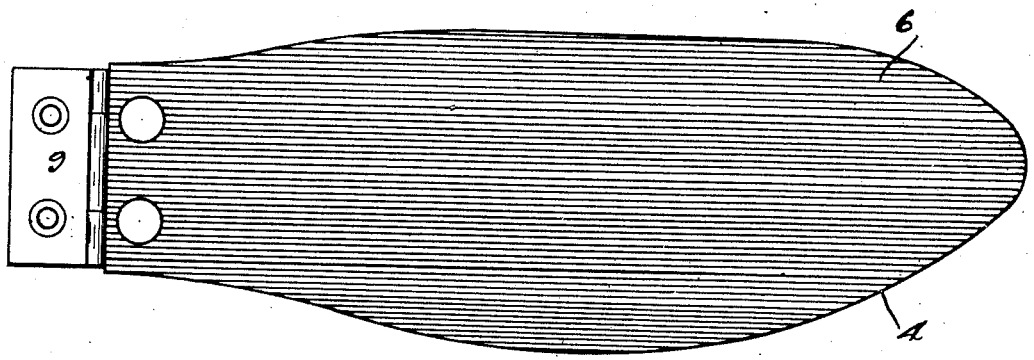
Fig. 2 represents a plan view of the foot pedal.
Figure 3:
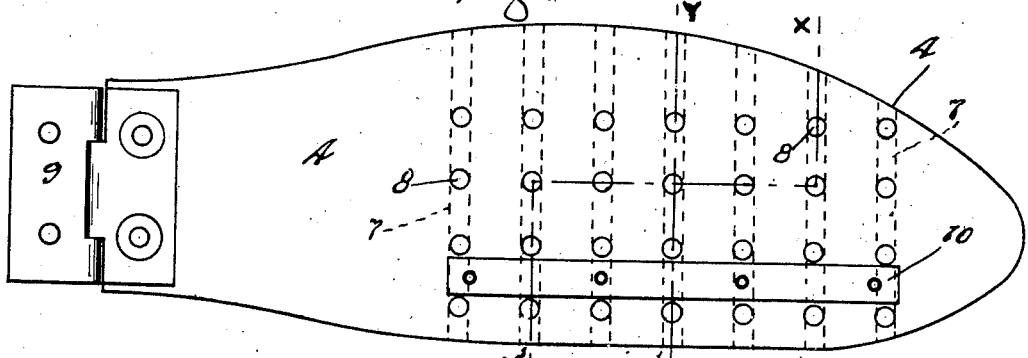
Fig. 3 represents an inverted plan view of the pedal.
Figure 4:
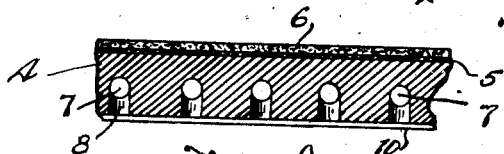
Fig. 4 represents a longitudinal sectional view through a part of the pedal, the section being taken in the plane denoted by the line X—X' Fig. 3.
Figure 5:
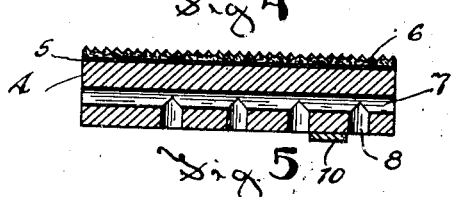
Fig. 5 represents a cross sectional view through the pedal, the section being taken in the plane denoted by the line Y—Y' Fig. 3.

The foot pedal is secured in position in the automobile by fastening it by means of a hinge 9 to the bottom board of the car. When finally installed the foot pedal takes the position as best shown in Fig. 1 where it will be seen the foot pedal lies on top of the ordinary accelerator pedal 3. In order to prevent excessive wear of the foot pedal I have secured a wearing plate 10 to the underside of the foot pedal which wearing plate rides on the accelerator pedal.

From the above it will be apparent that the foot pedal makes a very convenient rest for the foot and insures of the positive control of the accelerator pedal at all times. The rubber facing prevents the possibility of the foot slipping and makes it very easy to control the pedal. By perforating, that is to say by providing the cross passages and inlet holes to the passages, I am able to keep the underside of the foot pedal comparatively cool as the hot air from the engine which finds its way through the slot 2 is free to enter the openings 8 and go into the passages 7 and in actual practice it will be swept out of the passages 7 by a cold air draft passing across the automobile. As the foot is further insulated by the asbestos 5 there is practically no heat gets through the foot pedal so that the foot is at all times comfortable and cool.

While I have shown a particular arrangement of cross passages and inlet openings, still it will be understood I do not wish to be restricted to the precise formation shown as this could be readily modified without in the least departing from the spirit of the invention and as covered under the scope of the appended claims.

What I claim as my invention is:—

1. A foot pedal having cross passages passing from side to side thereof and openings passing from the underside of the pedal and terminating in the passages.

2. A foot pedal comprising a bottom board having cross passages formed therein and passing from side to side and inlet openings passing from the underside of the pedal and communicating with the passages, an asbestos lining applied on the top side of the board and a rubber surfacing coating applied on top of the asbestos lining.

Signed at Winnipeg, this 29 day of November 1918.

JOSEPH BROWN STEWART.

In the presence of—
G. S. ROXBURGH,
K. B. WAKEFIELD.